United States Patent

McGee et al.

(10) Patent No.: US 6,965,835 B2
(45) Date of Patent: Nov. 15, 2005

(54) TORQUE ANGLE SENSING SYSTEM AND METHOD WITH ANGLE INDICATION

(75) Inventors: Phillip McGee, Owatonna, MN (US); Robert Kochie, Mantorville, MN (US); Durval Ribeiro, Owatonna, MN (US)

(73) Assignee: SPX Corporation, Charlotte, NC (US)

( * ) Notice: Subject to any disclaimer, the term of this patent is extended or adjusted under 35 U.S.C. 154(b) by 31 days.

(21) Appl. No.: 09/964,470

(22) Filed: Sep. 28, 2001

(65) Prior Publication Data

US 2003/0065456 A1 Apr. 3, 2003

(51) Int. Cl.$^7$ .............................. G01L 1/00; G01F 1/32
(52) U.S. Cl. ...................... 702/41; 702/151; 73/861.23
(58) Field of Search ........................... 702/33, 41, 113, 702/150, 151; 73/761, 862.08, 862.21, 862.23

(56) References Cited

U.S. PATENT DOCUMENTS

| | | | |
|---|---|---|---|
| 4,211,120 A * | 7/1980 | Tambini | 73/761 |
| 4,308,779 A * | 1/1982 | Suzuki et al. | 84/687 |
| 4,589,289 A * | 5/1986 | Neuhaus | 73/862.23 |
| 4,845,998 A * | 7/1989 | DeMartelaere et al. | 73/862.23 |
| 5,095,746 A * | 3/1992 | Stanis | 73/178 R |
| 5,476,014 A * | 12/1995 | Lampe et al. | 73/862.23 |
| 5,571,971 A * | 11/1996 | Chastel et al. | 73/761 |
| 5,581,042 A * | 12/1996 | Tambini | 73/862.21 |
| 5,589,644 A | 12/1996 | Becker et al. | 73/862.23 |
| 6,345,436 B1 * | 2/2002 | Codrington | 29/720 |
| 6,609,407 B1 * | 8/2003 | Tambini | 73/1.11 |
| 2003/0040883 A1 * | 2/2003 | Ermer et al. | 702/145 |

FOREIGN PATENT DOCUMENTS

JP 07205042 A * 8/1995 ......... B25B 23/142

OTHER PUBLICATIONS

User's Manual, "TQJE 1000", Snap-On Tools Corporation, Kenosha, WI, 53141-1410, 12 pages.

* cited by examiner

Primary Examiner—John Barlow
Assistant Examiner—Meagan S Walling
(74) Attorney, Agent, or Firm—Baker & Hostetler LLP (57) ABSTRACT

A device used for measuring the angle of torque beyond a specific reference point. The device is comprised of a tool that applies torque to a fastener, an adapter that is attached to the fastener to transfer the torque from the tool, and an apparatus that connects a first end to the tool and a second end to the adapter. The apparatus comprises an angle selector that is adjustable to the desired torque angle, an angle rate sensor that measures the speed and direction of the torque applied, a processor which calculates the current angle from the rate sensor measurements, a zero point indicator that serves as the basis point for the processor to calculate the selected angle, and an angle indicator that indicates the current angle of rotation.

11 Claims, 6 Drawing Sheets

TORQUE ANGLE SENSING SYSTEM AND METHOD WITH ANGLE INDICATION

FIELD OF THE INVENTION

The present invention relates generally to a torque angle measuring device. More particularly, the present invention relates to a torque angle sensor that measures the current angle of rotation applied beyond a point of reference.

BACKGROUND OF THE INVENTION

The importance of accurately and consistently controlling tension or preload applied to threaded fasteners increases with precision or criticality of parameters and tolerances of the assembly as a whole. This is particularly true in mass production of precision-designed equipment which may later be subjected to maintenance or repair, following which load applied to the assembly fasteners must be substantially the same as that applied during original manufacture. For example, in the manufacture of internal combustion engines designed for high performance and fuel economy, the head is fastened to the engine block with a plurality of bolts prior to final machining of various block/cylinder critical surfaces. In the event that the head is later removed for repair or replacement, it is important that the same be precisely reassembled to the block so as to restore relationships of critical surfaces obtained during the original manufacturing machining operations.

Conventionally, preloading of threaded fasteners in engine and other assembly applications is controlled by monitoring torque applied to the assembly tool, such as with a mechanical or electrical torque wrench. Fastener preload control through monitoring of fastener torque alone, however, yields unpredictable and inconsistent results due in part to varying friction between the mating threads and beneath the fastener head. Where it has been attempted to obtain greater uniformity through use of lubricants or the like, results have continued to be unsatisfactory.

Another approach has been to monitor torque as a function of angle of rotation, determine rate of change of torque, and compare the resulting data during the manufacturing operation to empirically determine data prestored in a computer memory. Such arrangements still do not directly measure fastener tension, and in addition require expensive assembly and control hardware.

A third approach has been to tighten the fastener to a point at which the fastener material yields and the fastener head separates from the threaded body. Arrangements of this type suffer from the same inherent drawbacks as the torque wrench technique described above due to varying friction between the fastener and the assembly, and also increases the cost of both manufacture and repair due to requirement for special double-headed fasteners.

A further technique for controlling fastener preload has been found to yield particularly consistent results. This technique, termed "torque-turn" or "torque-angle," involves initially tightening the fastener to a specified torque, and thereafter tightening the fastener through an additional pre-specified angle. The initial tightening torque is empirically predetermined to be one at which the fastener is tightened in assembly but has not yet been substantially elastically stretched. By thereafter tightening the fastener through an additional angle or fraction of a turn, advantage is taken of the precision machining of the fastener threads so as to obtain predetermined elastic stretching of the fastener within the assembly. For example, a torque-turn or torque-angle fastening specification may call for initial tightening to a torque of twenty-five Newton-meters, followed by an additional one-half turn or a one hundred and eighty-degree rotation in three equal steps.

The following is an example of torque instructions that accompany a service manual and the need for torque angle measurements.

Tighten the Cylinder Head Bolts.
  a. Tighten the cylinder head bolts a first pass in sequence to 30 N·m (22 lb ft).
  b. Tighten the cylinder head bolts a second pass in sequence to 70 degrees.
  c. Tighten the cylinder head bolts (1,2,3,4,5,6,7,8) to 70 degrees and the cylinder head bolts (9 and 10) to 60 degrees a final pass in sequence.

Computer-based equipment has been proposed for implementing such fastener preloading technique in mass production operations. However, as previously noted, control during maintenance and repair is as important as control during original assembly.

There remains a need in the art for inexpensive equipment which may be employed by maintenance and repair technicians in the field for obtaining the same precision control of fastener preloading as is done during the original manufacturing operation. Additionally, the products on the market that perform such a function are large and cumbersome. These products use torque angle detection techniques that inhibit their ability as well as for the operability in constrained spaces.

Accordingly, it is desirable to provide a device that is capable of determining the angle of rotation applied to a fastener as well as display the current angle of rotation.

SUMMARY OF THE INVENTION

It is therefore an object of the present invention to provide an apparatus that measures and displays the current angle of rotation at which a fastener is rotated.

It is another aspect of the present invention to provide an apparatus that measures the angle of rotation after a specified torque is applied to a fastener with an apparatus compactly sized to function in confining areas.

The above and other aspects are achieved through the use of a novel combination of features as herein disclosed. In accordance with one embodiment of the present invention, an apparatus measures the angle of rotation beyond a specific reference point and an angle indicator linked to the apparatus indicates the current angle of rotation.

In a preferred embodiment, the apparatus comprises an angle selector that is adjustable to the desired angle of rotation, an angle rate sensor that measures the speed and direction of the rotation applied, a processor which calculates the current angle from the rate sensor measurements and a zero point indicator that serves as the basis point for the processor to calculate the selected angle of rotation.

In accordance with another embodiment of the present invention, a device for measuring the angle of rotation beyond a specific reference point is comprised of a means for measuring an angle of rotation of the fastener from a fixed reference point and a means for displaying the current angle of rotation. In this alternate embodiment, the means for measuring an angle of rotation is comprised of means for applying an angle of rotation to a fastener, and a means for measuring the angle of rotation as applied to the fastener from a fixed reference point. The means for measuring comprises a means for selecting the desired angle of rotation angle, a means for sensing data from the rate and speed of the rotation being applied to a fastener, a means for calculating the torque angle from the data and a means for indicating a zero point from which the means for calculating bases its angle of rotation measurement.

In accordance with another embodiment of the present invention, a method for determining the angle of rotation is comprised of measuring the angle of rotation as applied to a fastener and displaying the current angle of rotation. In this embodiment, the step of measuring the current angle of rotation is comprised of selecting the desired angle of rotation with an angle selector located on an apparatus. Further steps to the method are indicating the zero point to processor as to the basis point to determine the angle of rotation, applying torque to a fastener with a tool to which the apparatus is attached, measuring the rate and speed of the angle of rotation with the angle rate sensor starting from the zero point and calculating the area from the rate and speed to arrive at the torque angle, the area.

In accordance with another embodiment of the present invention, a system is used to determine the angle of rotation beyond a specific reference point. The system is comprised of an apparatus that measures the angle of rotation beyond a specific reference point and an angle indicator linked to the apparatus that indicates the current angle of rotation. In this preferred embodiment, the apparatus is comprised of an angle selector adjustable to the desired angle of rotation, an angle rate sensor that measures the speed and direction of the torque applied, a processor which calculates the current angle from the rate sensor measurements and a zero point indicator that instructs the processor as to the basis point to calculate the selected angle.

There has thus been outlined, rather broadly, the more important features of the invention in order that the detailed description thereof that follows may be better understood, and in order that the present contribution to the art may be better appreciated. There are, of course, additional features of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein, as well as the abstract, is for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION OF PREFERRED EMBODIMENTS OF THE INVENTION

Figure 1:
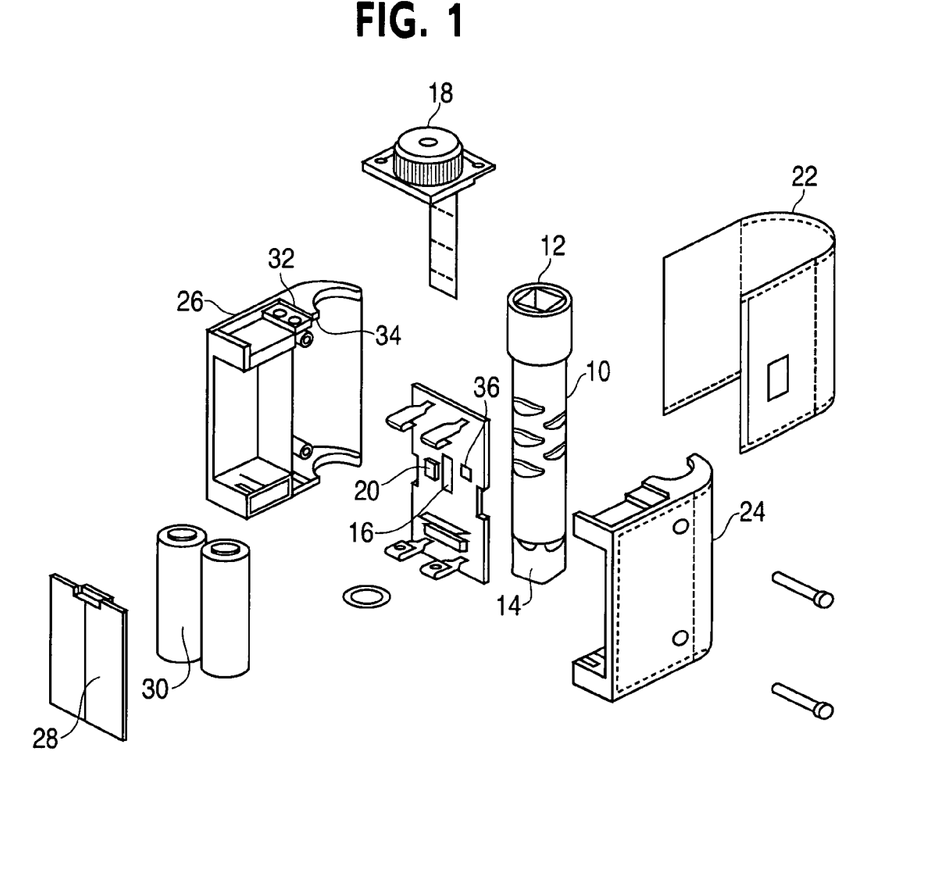
FIG. 1 provides an exploded perspective view of the preferred embodiment.

A preferred embodiment of the present invention provides a device that measures an angle of rotation of a fastener after a specified torque has been applied to the fastener. As illustrated in FIG. 1, a preferred embodiment includes a shaft 10 is inserted between a socket and torque wrench. The wrench end 12 is connected to the torque wrench. The socket end 14 is connected to a socket that is chosen for the appropriate fastener. The shaft 10 is linked to an angular rate sensor 16 such as a gyroscope. Additionally, the apparatus contains an angle selector 18. The angle selector 18 can be a potentiometer, which allows for angle selection in about five degree increments, or a resistance ladder, which allows for finer angle selection. The angle selector 18 varies the voltage and resistance. Any other suitable resistance adjuster can be used in place of either the ladder or the potentiometer.

The shaft 18 does not need to be a separate component between a socket and wrench. The shaft 18 itself can be incorporated either with the socket itself, the wrench itself, or be constructed as part of a combined socket and wrench.

Both the angular rate sensor 16 and the potentiometer 18 are linked to a microcontroller or processor 20. The angular rate sensor 16 measures the output steady state voltage that deviates depending on the speed and direction of the torque, using the Corolis effect. The processor then takes these measurements and calculates the area underneath the measured voltage curve to arrive at the torque angle.

A housing 22, 24, 26 encases the shaft 10 and all the other components of the apparatus. The housing 22, 24, 26 contains a door 28 for insertion of a power source, which in the preferred embodiment includes batteries 30.

The following is an example of how the device is used. After inserting the apparatus between the ratchet and socket, the user adjusts the angle selector 18 to the desired angle. At the time of selection of the angle, the processor 20 notes the voltage. Torque is then applied to the fastener until the desired torque is reached. At this time, the zero point is set. After setting the zero point, the wrench is rotated further. The angular rate sensor 16 measures the output steady state voltage and its deviation based upon the speed and direction of the torque. From these measurements, the processor 20 calculates the torque angle.

At some point, the apparatus indicates to the user when the currently calculated torque angle approaches and/or equals the desired angle. The alert can include a constant display of the angle through the use of a display such as a light emitting diode display or can include a single emitting diode to indicate when the angle has been reached. In the preferred embodiment, the invention contains light emitting diodes 32, 34 that provide indication to the user. The first diode 32 alerts the user that the fastener is within ten degrees of the specified angle. The second diode 34 alerts the user that the fastener is within one degree of the specified angle. Additionally, a sounding indicator 36 or a sound device activates concurrently with light emitting diode 34. The sound device 36 in the preferred embodiment is a buzzer. The sound indicator 36 is not limited to the use of a buzzer.

It will be readily apparent to one skilled in the art the available replacements for this device.

Figure 2:
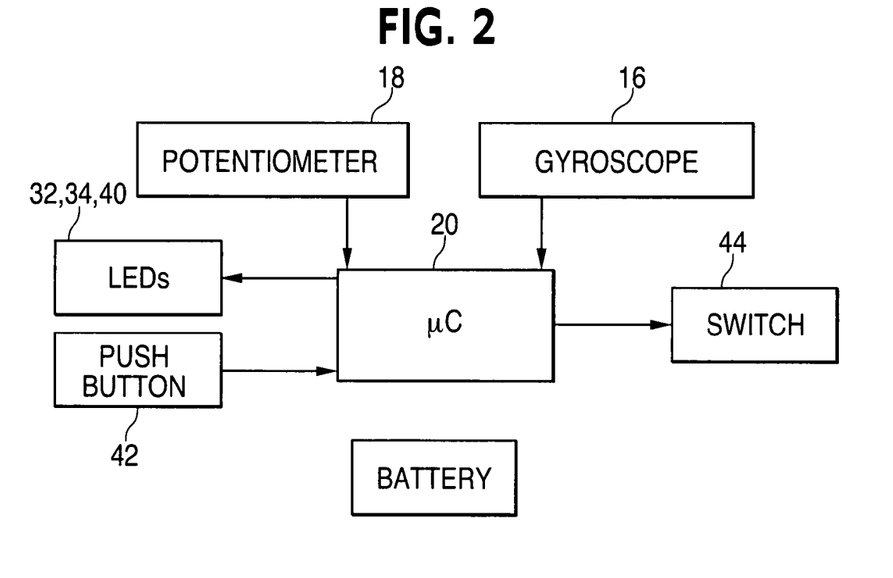
FIG. 2 provides a block diagram of the preferred embodiment.

FIG. 2 is a block diagram of the preferred embodiment. At the center of the diagram is a microcontroller 20. Feeding into the micorcontroller 20 is a potentiometer or other angle selector 18. The user of the apparatus uses the angle selector 18 to select the desired torque angle. The selection is fed into the microcontroller 20. From this point, the microcontroller 20 monitors the voltage. The point of selection is used as a reference to calculate the measured torque angle. The output of the gyroscope or angular rate sensor 16 is inputted into the microcontroller or processor 20. The angular rate sensor 16 measures the output steady state voltage. The output deviates depending on the speed and direction of the torque. These measurements are fed into the microcontroller 20 to where a calculation takes place. The calculation is the area underneath the curve of all the measurements obtained from the angular rate sensor 16. With this calculation, the torque angle can be detected.

The processor 20 controls the light emitting diodes 32, 34, 40. The first diode 40 is activated when the zero point is selected subsequent to the depression of button 42. The button instructs the processor 20 that the current location is the zero-point or reference point from which to calculate the torque angle. When the processor 20 acknowledges the zero point, the light emitting diode 40 is activated.

The other diodes are used to alert the user of the currently calculated torque angle. This ranges from a constant display of the angle through the use of a display such as a light emitting diode display or a liquid crystal display to a single emitting diode that alerts as to when the angle is reached. In the preferred embodiment, the invention contains the light emitting diodes, 32, 34, which warn the user. The first diode 32 alerts the user that they are within ten degrees of the specified angle. The second diode 34 alerts the user that they are within one degree of the specified angle. Additionally, a sounding indicator 36 or a sound device activates concurrently with light emitting diode 34.

A switch 44 is also incorporated on the apparatus. The switch 44 controls the power used by the gyroscope 16, the angle selector 18 and the light emitting diodes 32, 34, 40. The switch 44 serves as a power conservation device when the device is not being used to determine the torque angle.

Figure 3:
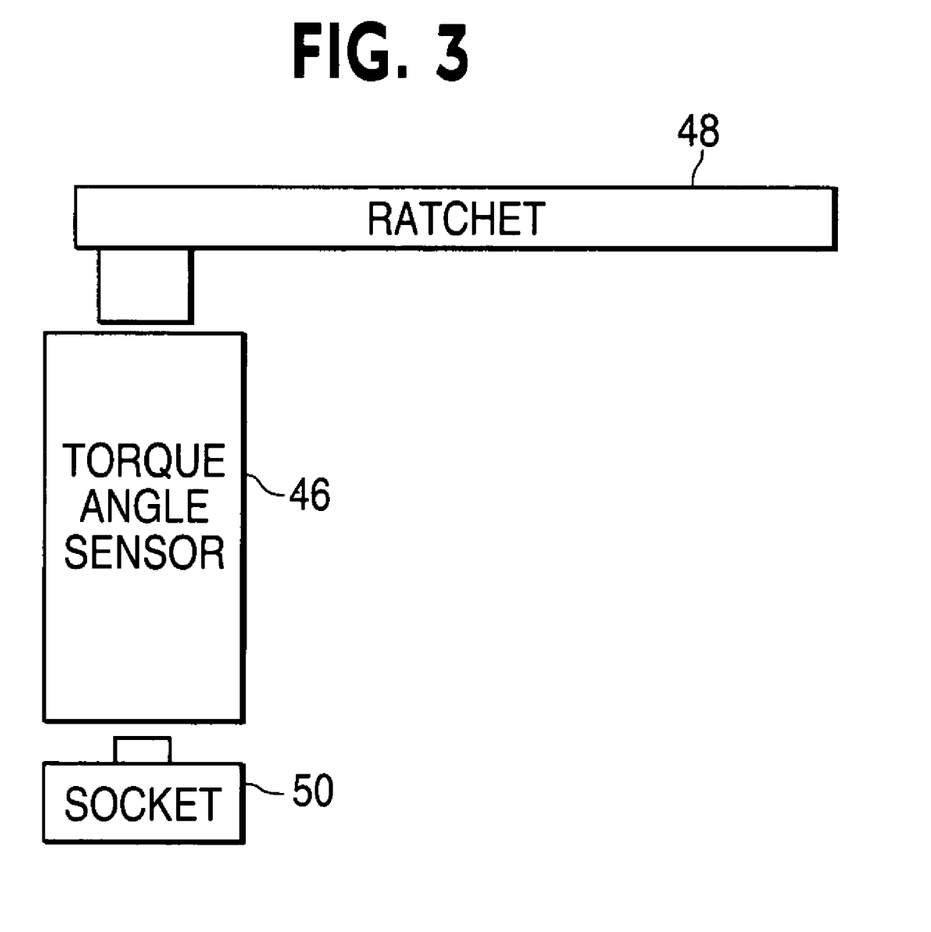
FIG. 3 is a view of the preferred embodiment incorporated with a ratchet and socket.

FIG. 3 shows the preferred embodiment of the torque angle sensor 46 with a ratchet handle and socket. The sensor 46 is placed between the ratchet 48 and the socket 50. The ratchet 48 is used to generate the torque to turn a fastener. The torque is transferred to the sensor 46 and then onto the socket 50. The sensor 46 measures the speed and directions of the torque and uses these calculations to arrive at the angle of rotation.

Figure 4:
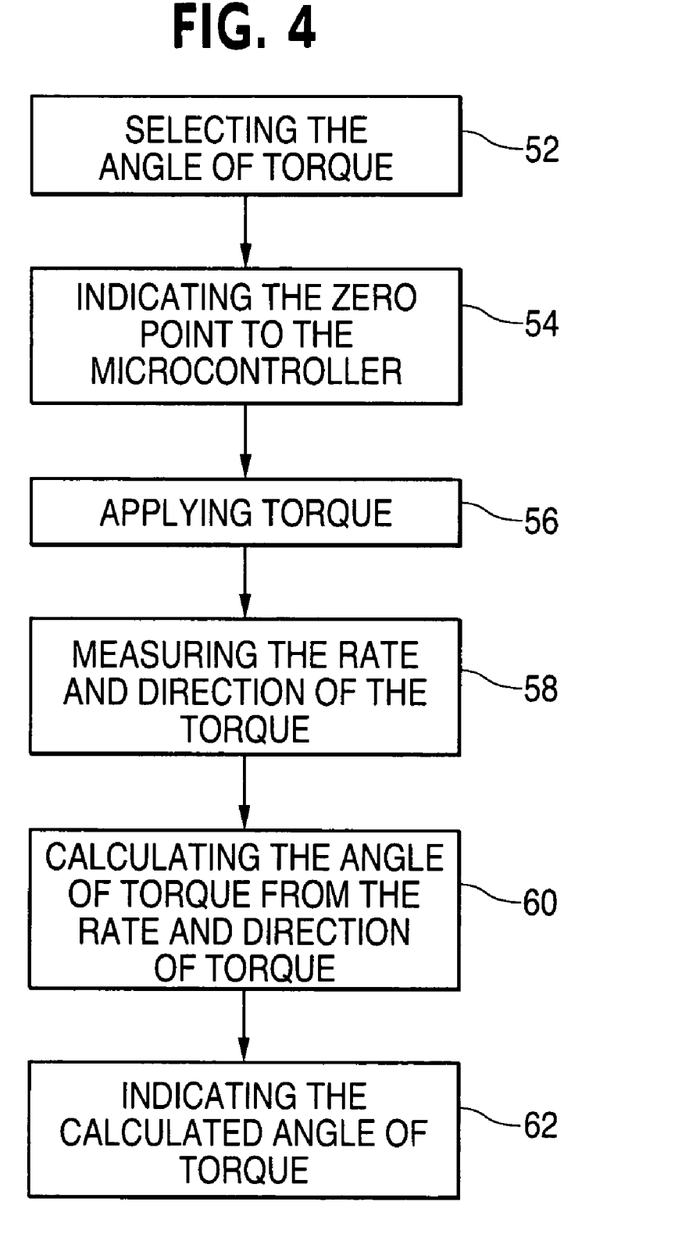
FIG. 4 is a flowchart illustrating the steps that may be followed in accordance with one embodiment of the present inventive method or process.

FIG. 4 is a flowchart illustrating the steps that may be followed in accordance with one embodiment of the present inventive method or process. The first step 52 in the process is selecting the desired angle of torque with an angle selector 18. The preferred embodiment uses a resistance ladder to achieve this method. However a potentiometer as well as other devices are interchangeable with that used in the preferred embodiment. The resistance ladder has a finer angle selection than the potentiometer.

The next step 54 is indicating the zero point to the processor in order to determine the angle of torque. The preferred embodiment accomplishes this function with the use of a button or switch 42. The button or switch 42 instructs the processor to mark this as the origination point from where to measure the torque angle. The processor responds with illuminating a light emitting diode. The illumination is a signal that the processor has indeed received the instruction and has marked it as a reference point.

The next step 56 is applying torque to rotate a fastener with a tool. The tool can be a ratchet or socket or any other device that is capable of applying torque. The tool can actually be the device incorporated or built into a torque-generating device. The tool can be manual-driven or power driven.

The next step 58 is measuring the rate and speed of the applied torque rotation with the angle rate sensor 16 starting from the zero point. The angle sensor 16 or gyroscope does this by measuring the Corolis effect of the torque.

From these measurements, the next step 60 of calculating the area is arrived at to determine the torque angle. The mathematical computations are completed by the processor. The output steady state voltage deviates depending on the speed and direction of the torque. This deviation enables the processor to calculate the torque angle.

The next step 62 is indicating the rotation angle of torque applied beyond the zero point using the angle indicator 32, 34. The preferred embodiment uses two angle indicators. The first indicator, a light emitting diode 32, is illuminated when the torque angle is within ten degrees of the pre-selected desired torque angle. The second indicator, a light emitting diode 34, is illuminated when the torque angle is within one degree of the specified angle. Concurrently with the second indicator, the apparatus uses a sound indicator 36. When the emitting diode 34 is activated, the sound indicator is triggered. In the preferred embodiment, the apparatus is a buzzer.

The indicating step 62 can use any number of devices. For example, the indicator 34, 36 can range from a graduated display that can be used to indicate the current angle calculated to a plurality of diodes as in the preferred embodiment. Additional indicating devices will be readily apparent to those of ordinary skill in the art.

Figure 5:
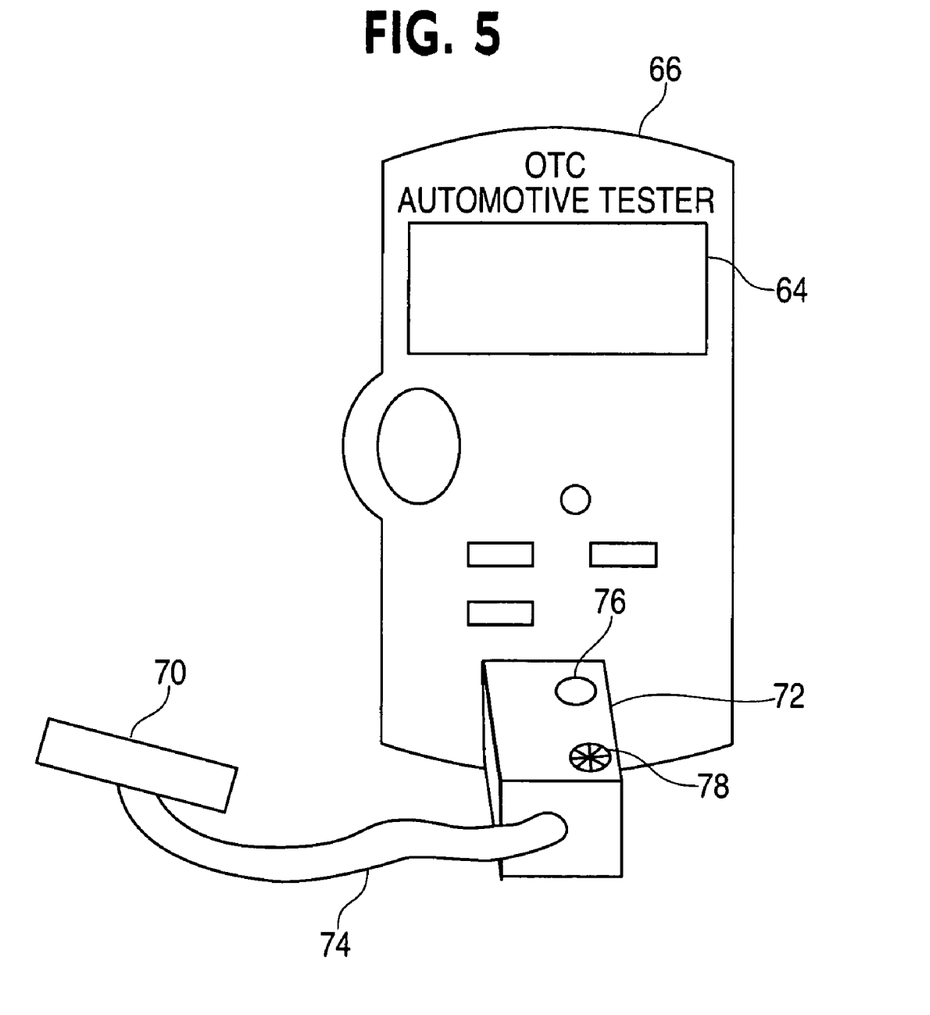
FIG. 5 provides a view of an alternate embodiment.

FIG. 5 provides a view of an alternate embodiment. In this embodiment, the indicator of torque angle is a display 64 of a digital multimeter 66. In this embodiment, the current angle of rotation is constantly displayed throughout the angle of rotation. A shaft 70 is placed between a fastener and a torque-generating device such as a ratchet 48. The speed and direction of rotation of the shaft 70 is monitored by an adapter 72, which uses these measurements to arrive at the angle of rotation. The angle of rotation is transferred to the digital multimeter 64. The angle of rotation is shown on the display 66, which is based from the zero point and continues to show the current angle of rotation.

The speed and direction of the angle of rotation applied to the shaft 70 is transmitted to the adapter 72 via the hard wire 74. The shaft 70 need not be hard wired to the adapter 72. The transmission can be accomplished by an infrared transmission or over a radio frequency, so that the data from the shaft 70 is transmitted in a non-hard wired configuration. The data is transmitted to a receiver on the adapter 72. The receiver captures the data to calculate the current angle and transmits this a signal to the multimeter 66.

In addition to a visual display, the preferred embodiment contains a sound generating device 78 on the adapter 72. When the desired angle of rotation has been reached, the sound device 78 is activated. In the preferred embodiment, the sound device 78 is audible to the human ear with an adequate distance from operation of the invention.

Figure 6:
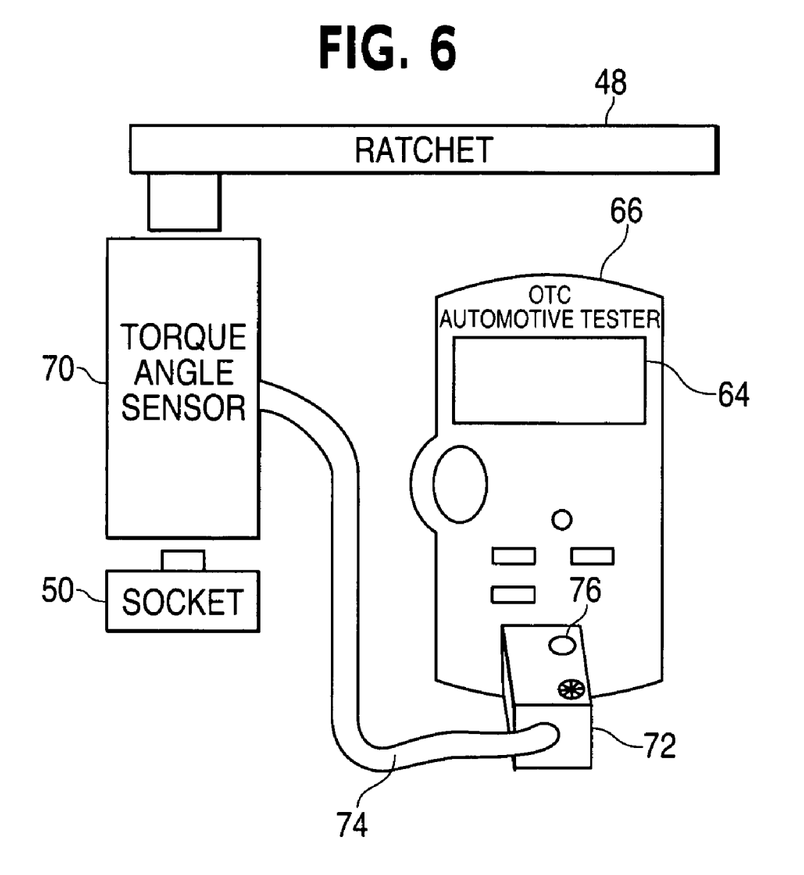
FIG. 6 is a view of the alternate embodiment incorporated with a ratchet and socket.

FIG. 6 shows an alternate preferred embodiment of the torque angle adapter with a ratchet 48 handle and socket 50. The shaft 70 is placed between the ratchet 48 and the socket 50. The ratchet 48 is used to generate the torque to turn a fastener. The torque is transferred to the shaft 70 and then onto the socket 50. The shaft 70 is monitored by the angular rate sensor 16 to measure the speed and directions of the angle of rotation and uses these calculations to arrive at the angle of rotation. The angle of rotation is calculated by the microcontroller 20. The result of this calculation is transformed into a signal by the microcontroller 20 and transmitted to the digital multimeter 66 where is seen on the display 76.

The many features and advantages of the invention are apparent from the detailed specification, and thus, it is intended by the appended claims to cover all such features and advantages of the invention which fall within the true spirits and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A method for determining an angle of rotation of a fastener, comprising:

measuring the angle of rotation, as applied to the fastener by a tool, with a device, which comprises a housing that includes a shaft and an angle rate sensor, the housing is configured to be positioned between the fastener and tool such that the shaft is directly connected to an end of the tool and directly to the fastener, the shaft is linked to an angle rate sensor that measures the speed and direction of the rotation applied;

wherein the step of measuring the angle of rotation comprises:

selecting a desired angle using an angle selector located on the housing, which further comprises a processor, a zero point indicator and an angle indicator;

indicating a zero point to the processor;

applying torque to the fastener with the tool to which the device is attached to rotate the fastener;

measuring the rate and speed of the rotation with the angle rate sensor starting from the zero point; and calculating an angle of rotation using the processor.

2. The method of claim 1, further comprising indicating that the processor has accepted the zero point.

3. The method of claim 1, further comprising the step of alerting that the desired selected angle of rotation has been reached.

4. A system for measuring an angle of rotation at a fastener beyond a specific reference point comprising:

a tool that applies torque to a fastener;

an apparatus that measures the angle of rotation beyond a specific reference point, the apparatus comprises a housing that includes an angle rate sensor that measures the speed and direction of the rotation applied and is configured to be located between the tool and fastener such that the shaft is directly connected to an end of the tool and the fastener; and an angle indicator located away from and linked to the apparatus wherein the housing further comprises:

an angle selector adjustable to a desired angle of rotation;

a processor that calculates a current angle of rotation from the rate sensor measurements; and a zero point indicator that sets a zero point for the processor to calculate the selected angle.

5. The system of claim 4, wherein the tool comprises a ratchet.

6. The system of claim 4, wherein the tool comprises a socket.

7. The system of claim 4, wherein the angle selector comprises a potentiometer.

8. The system of claim 4, wherein the angle selector comprises a resistance ladder.

9. The system of claim 4, wherein the processor comprises a microcontroller.

10. The system of claim 4, wherein the angle indicator is a digital multimeter.

11. The system of claim 4, wherein the angle indicator is a digital multimeter and a sound generating device that activates when the selected angle of rotation has been reached.

* * * * *